United States Patent
Han et al.

(10) Patent No.: US 10,473,844 B2
(45) Date of Patent: Nov. 12, 2019

(54) BACKLIGHT UNIT, LIQUID CRYSTAL DISPLAY DEVICE, AND ELECTRONIC DEVICE INCLUDING THE SAME

(71) Applicant: LG Display Co., Ltd., Seoul (KR)

(72) Inventors: JaeJung Han, Seoul (KR); SangHyun Lee, Gyeonggi-do (KR); YongJoong Yoon, Gyeonggi-do (KR); Hyosung Lee, Incheon (KR)

(73) Assignee: LG Display Co., Ltd., Seoul (KR)

(*) Notice: Subject to any disclaimer, the term of this patent is extended or adjusted under 35 U.S.C. 154(b) by 196 days.

(21) Appl. No.: 15/335,864

(22) Filed: Oct. 27, 2016

(65) Prior Publication Data
US 2017/0123140 A1    May 4, 2017

(30) Foreign Application Priority Data
Oct. 30, 2015   (KR) .................. 10-2015-0152629

(51) Int. Cl.
*F21V 8/00*    (2006.01)
(52) U.S. Cl.
CPC ......... *G02B 6/0055* (2013.01); *G02B 6/0045* (2013.01); *G02B 6/0051* (2013.01)
(58) Field of Classification Search
CPC ........................ G02B 6/0055; G02B 6/0051
See application file for complete search history.

(56) References Cited

U.S. PATENT DOCUMENTS

| | | | |
|---|---|---|---|
| 7,972,689 B2 * | 7/2011 | Hsu ...................... | G02B 5/0226 428/323 |
| 8,033,706 B1 * | 10/2011 | Kelly .................. | G02B 6/0036 362/307 |
| 8,810,528 B2 * | 8/2014 | Bita .................... | G02B 6/0055 345/173 |
| 8,866,757 B2 * | 10/2014 | Bita .................... | G02B 6/0055 345/173 |
| 9,823,411 B2 * | 11/2017 | Holman .............. | G02B 6/0061 |
| 2007/0127127 A1 | 6/2007 | Hsu et al. | |
| 2007/0274100 A1 | 11/2007 | Yang et al. | |

(Continued)

FOREIGN PATENT DOCUMENTS

| | | |
|---|---|---|
| CN | 101078795 A | 11/2007 |
| CN | 102804309 A | 11/2012 |
| KR | 10-2010-0038921 A | 4/2010 |

OTHER PUBLICATIONS

The First Notification of Office Action dated Dec. 5, 2018, from the China National Intellectual Property Administration in counterpart Chinese application No. 201610930292.8. Note: U.S. Pat. No. 8,033,706 B1 cited therein is already of record.

(Continued)

*Primary Examiner* — Joseph L Williams
(74) *Attorney, Agent, or Firm* — Morgan, Lewis & Bockius LLP

(57) ABSTRACT

A backlight unit, a liquid crystal display (LCD) device, and an electronic device including the same are provided. The backlight unit includes a light guide member having a light receiving edge provided on an outer wall, and a hole spaced apart from light receiving edge; a light source configured to provide light to the light receiving edge; and a reflective member on an inner wall of the hole of the light guide member.

22 Claims, 8 Drawing Sheets

(56) References Cited

U.S. PATENT DOCUMENTS

| | | | | |
|---|---|---|---|---|
| 2009/0001397 A1* | 1/2009 | Fine | .................... | G02B 6/0018 |
| | | | | 257/98 |
| 2012/0163020 A1 | 6/2012 | Inada et al. | | |
| 2017/0059771 A1* | 3/2017 | Yuki | ................. | G02F 1/133615 |
| 2017/0090099 A1* | 3/2017 | Lee | ....................... | G02B 6/002 |
| 2017/0090113 A1* | 3/2017 | Yuki | ................... | G02B 6/0088 |
| 2017/0336553 A1* | 11/2017 | Yuki | ................... | G02B 6/0031 |

OTHER PUBLICATIONS

The Second Notification of Office Action dated Jun. 28, 2019, from the China National Intellectual Property Administration in counterpart Chinese application No. 201610930292.8.

\* cited by examiner

BACKLIGHT UNIT, LIQUID CRYSTAL DISPLAY DEVICE, AND ELECTRONIC DEVICE INCLUDING THE SAME

CROSS-REFERENCE TO RELATED APPLICATIONS

This application claims the benefit of the Korean Patent Application No. 10-2015-0152629 filed on Oct. 30, 2015, which is hereby incorporated by reference as if fully set forth herein.

BACKGROUND

Field of the Invention

The present invention relates to a backlight unit, and a liquid crystal display (LCD) device and an electronic device including the same.

Discussion of the Related Art

A general liquid crystal display device is a light switching device, and displays an image using thin film transistors (TFTs). In addition to being used as a display for televisions and computer monitors, the liquid crystal display device is widely used as a display for devices, such as notebook computers, tablet computers, smart phones, portable display devices, and portable information devices. Because the liquid crystal display device is not a self-emitting device, the liquid crystal display device displays an image using light irradiated from a backlight unit arranged below a liquid crystal display panel.

Recently, as the fields of application for LCD devices become more diversified, backlight units and LCD devices must be developed with shapes based on the application.

For example, a backlight unit including a light guide member that has a circular shape and includes a circular hole formed in a center is disclosed in Korean Patent Registration No. 10-1521654-B1 (previously published as KR 10-2010-0038921-A).

However, in the backlight unit of the related art, because light is lost in an area near the hole, light efficiency is reduced, and light leakage occurs in the area near the hole.

SUMMARY

Accordingly, the present invention is directed to a backlight unit, an LCD device, and an electronic device including the same that substantially obviate one or more problems due to limitations and disadvantages of the related art.

An object of the present invention is to provide a backlight unit which includes a light guide member including a hole and reduces loss and leakage of light occurring in an area near the hole, and an LCD device and an electronic device including the same.

Additional features and advantages of the invention will be set forth in the description which follows, and in part may be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a backlight unit comprises a light guide member including a light receiving edge provided on an outer wall, and a hole spaced apart from light receiving edge; a light source configured to provide light to the light receiving edge; and a reflective member on an inner wall of the hole of the light guide member.

In another aspect, a liquid crystal display (LCD) device comprises a backlight unit including: a light guide member having a light receiving edge provided on an outer wall, and a hole spaced apart from light receiving edge, a light source configured to provide light to the light receiving edge, and a reflective member on an inner wall of the hole of the light guide member; and a liquid crystal display panel including a hole communicating with the hole of the light guide member.

In another aspect, electronic device comprises a backlight unit including: a light guide member having a light receiving edge provided on an outer wall, and a hole spaced apart from light receiving edge, a light source configured to provide light to the light receiving edge, and a reflective member on an inner wall of the hole of the light guide member; a liquid crystal display panel including a hole communicating with the hole of the light guide member; and an auxiliary mechanism in the hole of the light guide member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
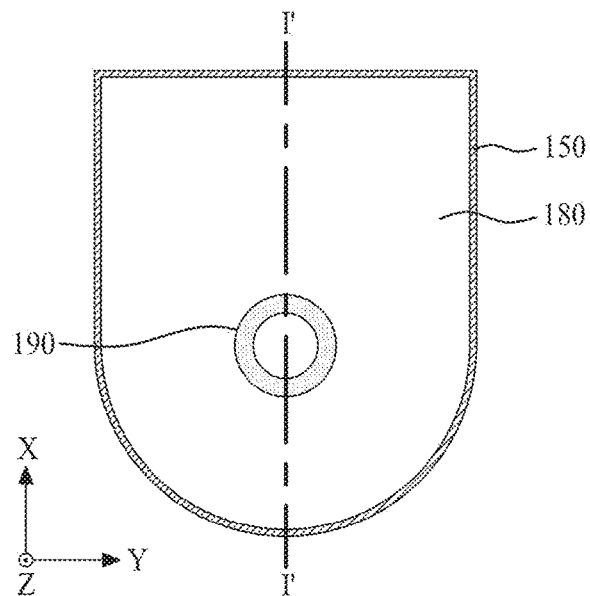
FIG. 1 is a plan view for describing a backlight unit according to a first example embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a backlight unit, and an LCD device and an electronic device including the same according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2:
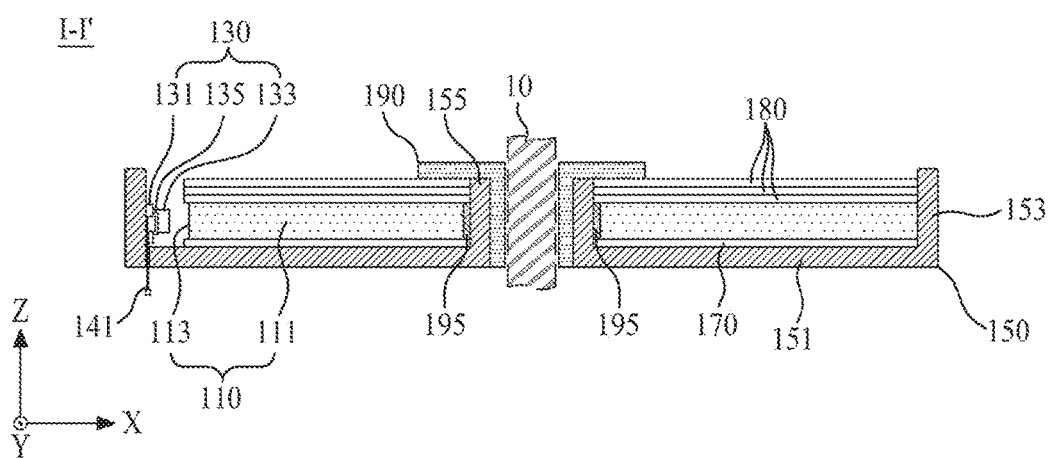
FIG. 2 is a cross-sectional view taken along line I-I' of FIG. 1.
Figure 3:
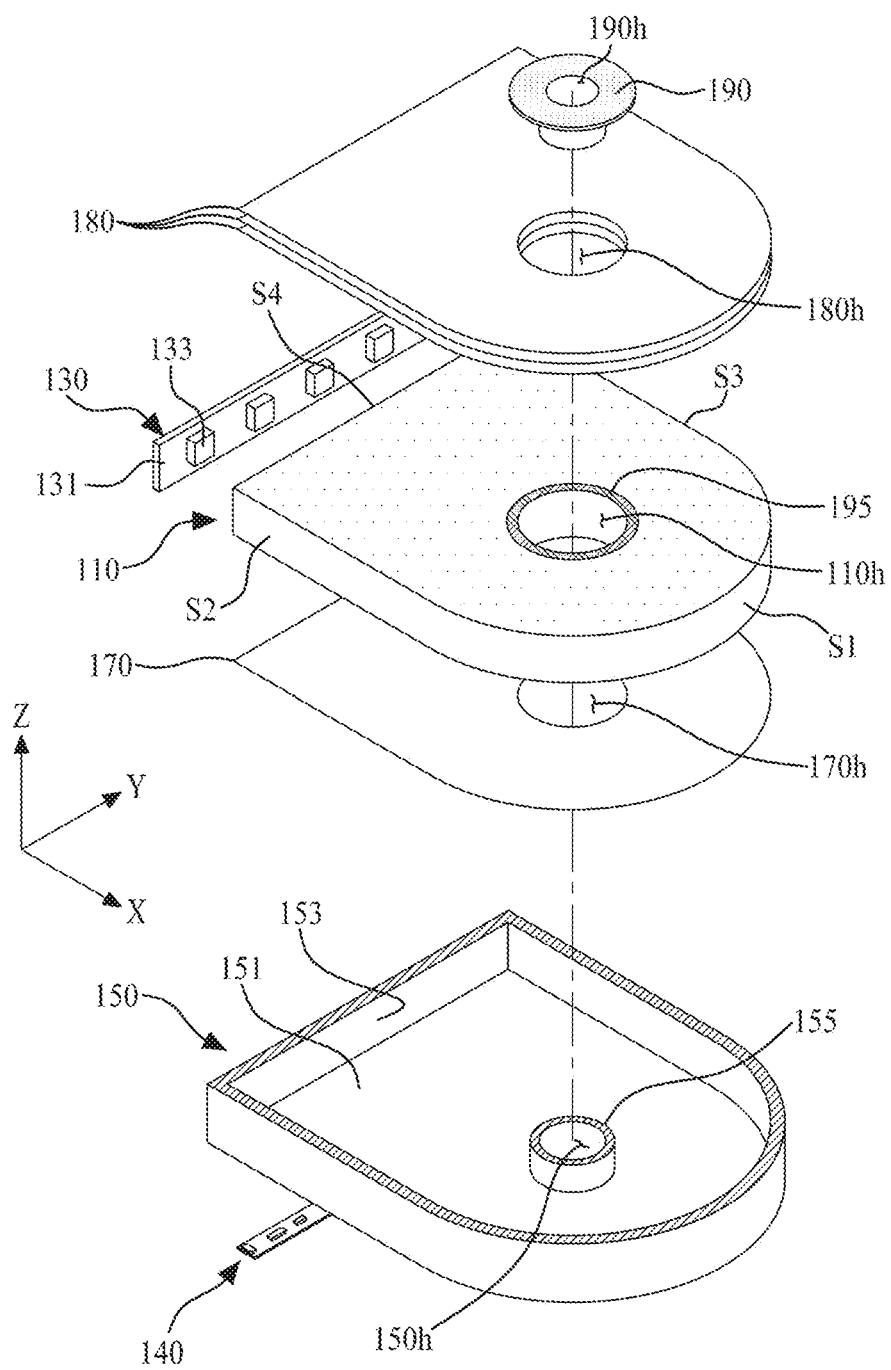
FIG. 3 is an exploded perspective view of a backlight unit illustrated in FIG. 1.

FIG. 1 is a plan view for describing a backlight unit according to a first example embodiment of the present invention. FIG. 2 is a cross-sectional view taken along line I-I' of FIG. 1. FIG. 3 is an exploded perspective view of a backlight unit illustrated in FIG. 1.

With reference to FIGS. 1 to 3, the backlight unit may include a light guide member 110, a light source module 130, and a housing member 150.

The light guide member 110 transfers light incident from the light source module 130 to an up direction Z. The light guide member 110 according to an embodiment may include a body 111, a first hole 110h, and an light incident part (light receiving edge) 113.

The body 111 may have a polygonal shape including a curved surface S1. For example, the body 111 according to an embodiment may include a first outer wall S1 having a curved shape having a certain curvature, a second outer wall S2 parallel to a first axial direction X and connected to one end of the first outer wall S1, a third outer wall S3 parallel to the second outer wall S2 and connected to the other end of the first outer wall S1, and a fourth outer wall S4 parallel to a second axial direction Y horizontally intersecting the first axial direction X and connected to the other end of the second outer wall S2 and the other end of the third outer wall S3. That is, the body 111 according to an embodiment may have a generally rectangular shape where one outer side S1 is planarly rounded in a curved shape. The light incident part 113 may be provided on the fourth outer wall S4.

The body 111 may include at least one material selected from among poly methyl methacrylate (PMMA), polycarbonate (PC), polymethylpentene (PMP), polyamide (PA), polyesterimide (PEI), polystyrene (PS), polyethersulfone (PES), acrylonitrile styrene (AS), etc.

The first hole 110h may be provided to vertically pass through the light guide member 110 (e.g., a partial area of the body 111) along a vertical axial direction Z vertically intersecting the first axial direction X. The first hole 110h according to an embodiment may be spaced apart from the light incident part 113 and may have a circular shape having a certain diameter.

An auxiliary mechanism 10, such as an input mechanism for display or a physical mechanism, may be inserted into and disposed in the first hole 110h. Here, the input mechanism for display may be a rotational shaft of a jog shuttle. Also, the physical mechanism may be a rotational shaft of a clock hand, a rotational shaft of a blast apparatus, a rotational shaft of an instrument panel for vehicles, or the like.

A reflective member 195 may be provided on an inner wall of the body 111 which is provided based on the first hole 110h. In an embodiment of the present invention, light is not lost in an area where the first hole 110h is provided because the reflective member 195 is provided. Accordingly, light efficiency is enhanced, and light leakage does not occur in the area where the hole 110h is provided.

The reflective member 195 according to an embodiment may include a specular reflection film where an incident angle and a reflection angle are the same, and in this case, light efficiency is enhanced, and light leakage does not occur. The specular reflection film may have a stacked structure where a plurality of layers are stacked. According to an embodiment, the stacked structure may include a metal layer, such as silver (Ag), aluminum (Al), or the like. According to another embodiment, the stacked structure may be a structure where material layers having refractive index anisotropic characteristic are alternately stacked. Because the material layers having refractive index anisotropic characteristic are biaxially oriented, a refractive index difference occurs in directions in which orientation is performed, total reflection instead of polarization reflection is made like a dual brightness enhancement film (DBEF) for which uniaxial orientation has been performed. When orientation is performed at the same ratio in two orientation axes, a refractive index difference is the same in the two orientation axes, and thus, the reflective member 195 having refractive index anisotropic characteristic may be provided by alternately stacking a material layer having a refractive index "n1" and a material layer having a refractive index "n2." In the stacked structure, thicknesses of individual layers may be the same or may be different.

According to another embodiment, the reflective member 195 may include a scattering film. The scattering film may include an upper film including an inorganic particle, a lower film including an inorganic particle, a plurality of beads provided between the upper film and the lower film, and an air pocket between the plurality of beads, but is not limited thereto.

In addition, the light guide member 110 may further include a light path change pattern (not shown) provided on a top and/or a bottom of the body 111. The light path change pattern may reflect or refract light incident on the light incident part 113 and travels in the body 111, and may output the refracted light to on the body 111. The light path change pattern may have a density which increases in a direction from the light incident part 113 to the first outer wall S1, for making luminance of light output from the top of the body 111 uniform. For example, the light path change pattern may be an engraved pattern or an embossed pattern having a dot shape, a polygonal shape, or a linear shape.

The light source module 130 may be disposed to face the light incident part 113 of the light guide member 110. The light source module 130 may include a plurality of light-emitting diodes (LEDs). The light source module 130 may irradiate light, emitted from each of the plurality of LEDs 133, onto the light incident part 113 of the light guide member 110. The light source module 130 according to an embodiment may include a flexible printed circuit board (FPCB) 131, the plurality of LEDs 133, and an LED connector 135.

The FPCB 131 may be disposed to face the light incident part 113 of the light guide member 110. The FPCB 131 may include a light source driving power line and a light source common power line.

The plurality of LEDs 133 may be spaced apart from each other and may be mounted on the FPCB 131 to irradiate light onto the light incident part 113 of the light guide member 110. That is, each of the LEDs 133 may be mounted on the FPCB 131 and may be connected to the light source driving power line and the light source common power line. Also, each of the LEDs 133 may emit the light with a light source driving power supplied from the light source driving power line to irradiate the light onto the light incident part 113 of the light guide member 110.

The plurality of LEDs 133 according to an embodiment may each be manufactured as an LED package and may be mounted on the FPCB 131. Here, the LED package may be a top view type. According to another embodiment, the plurality of LEDs 133 may each be manufactured as a chip type LED and may be mounted on the FPCB 131, and in this case, the light source module 130 may further include an optical lens (not shown) covering each of the LEDs 133 having a chip type.

The LED connector 135 may be mounted on one side of the FPCB 131. The LED connector 135 may respectively supply the light source driving power and a light source common power, supplied from a light source driver 140 through a backlight power cable 141, to the light source driving power line and the light source common power line of the FPCB 131.

The light source driver 140 may be disposed on a rear surface of the housing member 150 and may be connected to the LED connector 135 through the backlight power cable 141. The light source driver 140 may generate the light source driving power to allow the LEDs 133 to individually emit light, thereby controlling luminance for each area of the light guide member 110. In this case, the light source driver 140 may generate the light source driving power for individually controlling luminance for each area of the light guide member 110 in response to a backlight dimming signal based on local dimming technology. To this end, the light source driver 140 may divide the plurality of LEDs into a plurality of light source groups and may allow each of the light source groups to individually emit light. Here, one of the light source groups may include at least one LED.

The housing member 150 may include a second hole 150h which communicates with the first hole 110h provided in the light guide member 110. The housing member 150 may accommodate the light guide member 110 and may support the light source module 130. The housing member 150 may act as a rear cover that supports the light guide member 110 and the light source module 130.

The housing member 150 according to an embodiment may include a floor 151, a side wall 153, and a protrusion 155. The floor 151 may support a rear surface of the light guide member 110 and may have a shape that is the same as that of the light guide member 110. In addition, the floor 151 may include a protrusion pattern for increasing rigidity of the housing member 150.

The side wall 153 may be provided to a certain height in an end of the floor 151 and may surround the outer walls S1 to S4 of the light guide member 110.

The protrusion 155 may protrude from the floor 151 and may include the second hole 150h. The protrusion 155 may be inserted into the first hole 110h provided in the light guide member 110. However, depending on the case, the protrusion 155 may be omitted.

In addition, the backlight unit according to the first embodiment of the present invention may further include a reflective sheet 170 and an optical sheet part 180. The reflective sheet 170 may include a first communication hole 170h that communicates with the first hole 110h provided in the light guide member 110. In this case, the reflective sheet 170 may have a shape which is the same as that of the light guide member 110. The reflective sheet 170 may be disposed between the light guide member 110 and the housing member 150 and may reflect light, emitted to a bottom of the light guide member 110, to on the light guide member 110 to minimize loss of light.

The first communication hole 170h may be provided to vertically pass through a partial area of the reflective sheet 170 overlapping the first hole 110h of the light guide member 110 along the vertical axial direction Z. The first communication hole 170h may be provided to have a size that enables the protrusion 155 provided in the housing member 150 to vertically pass through the first communication hole 170h.

The optical sheet part 180 may be disposed on the light guide member 110 and enhances luminance characteristic of light output from the light guide member 110. For example, the optical sheet part 180 may include a diffusive sheet, a lower prism sheet, an upper prism sheet, and a dual brightness enhancement film (DBEF), but is not limited thereto. In other embodiments, the optical sheet part 180 may be configured by a stacked combination of three or more films selected from among a diffusive sheet, a prism sheet, a lenticular sheet, and a DBEF.

The optical sheet part 180 may include a second communication hole 180h which communicates with the first hole 110h provided in the light guide member 110. The second communication hole 180h may be provided to vertically pass through a partial area of the optical sheet part 180 overlapping the first hole 110h of the light guide member 110 along the vertical axial direction Z. The second communication hole 180h may have a size that enables the protrusion 155 provided in the housing member 150 to vertically pass through the second communication hole 180h.

In addition, the backlight unit according to the first embodiment of the present invention may further include a hole cap 190. The hole cap 190 may be inserted into the second hole 150h of the housing member 150 and may cover the optical sheet part 180 near the second communication hole 180h provided in the optical sheet part 180. The hole cap 190 prevents light leakage from occurring in the first hole 110h area of the optical guide member 110. To this end, the hole cap 190 according to an embodiment may include a cap plate 191, a cap post 193, and a third communication hole 190h.

The cap plate 191 may have a shape corresponding to the second hole 150h and may cover the optical sheet part 180 near the second communication hole 180h provided in the optical sheet part 180. The cap post 193 may protrude from a bottom of the cap plate 191 and may be inserted into the second hole 150h of the housing member 150. Here, the cap post 193 may have a size that enables the cap post 193 to be inserted into the second hole 150h provided in the protrusion 153 of the housing member 150.

The third communication hole 190h may be provided to vertically pass through a center of each of the cap post 193 and the cap plate 191 overlapping the second hole 150h along the vertical axial direction Z. The third communication hole 190h may have a size that enables the auxiliary mechanism 10 to be inserted into the third communication hole 190h. However, depending on the application requirements, the hole cap 190 may be omitted.

In the backlight unit according to the first embodiment of the present invention, because the reflective member 195 is disposed on an inner wall of the light guide member 110 provided based on the first hole 110h, luminance near the first hole 110h is uniform, and whole luminance of the light guide member 110 is uniform.

FIGS. 4A to 4F are plan views for describing various shapes of a light guide member in a backlight unit according to modified embodiments of the present invention.

Figure 4A:
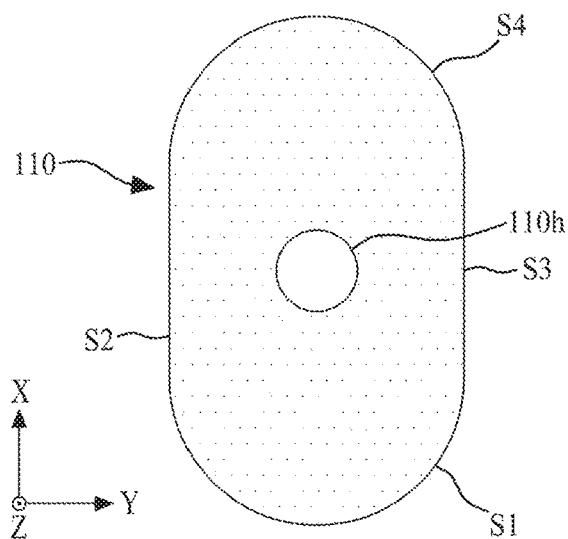
FIGS. 4A to 4F are plan views for describing various shapes of a light guide member in a backlight unit according to modified example embodiments of the present invention.

With reference to FIG. 4A, a light guide member 110 according to a first modified embodiment may have a rectangular shape, including a first hole 110h, in which each of one side S1 and another side S2 facing each other is a curved surface. For example, the light guide member 110 according to the first modified embodiment may include a first outer wall S1 having a curved shape having a certain curvature, a second outer wall S2 parallel to a first axial direction X and connected to one end of the first outer wall S1, a third outer wall S3 parallel to the second outer wall S2 and connected to the other end of the first outer wall S1, and a fourth outer wall S4 having a curved shape with a certain curvature and connected to the other end of the second outer wall S2 and the other end of the third outer wall S3. Here, the first and second outer walls S1 and S4 may have a symmetric structure about the first hole 110h.

Figure 4B:
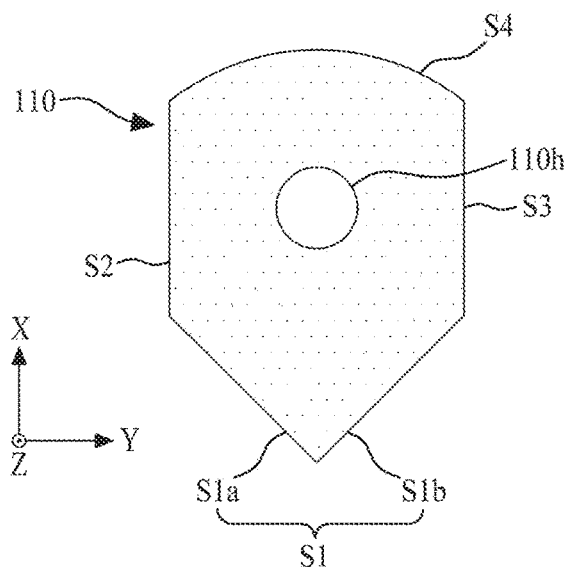

With reference to FIG. 4B, a light guide member 110 according to a second modified embodiment may have a tetragonal shape, including a first hole 110h, where one side S1 is an inclined surface having a triangular shape and another side S2 opposite to the one side S1 is a curved surface. For example, the light guide member 110 according to the second modified embodiment may include a first outer wall S1 including a first inclined surface S1a and a second inclined surface S1b, a second outer wall S2 parallel to a first axial direction X and connected to one end of the first outer wall S1, a third outer wall S3 parallel to the second outer wall S2 and connected to the other end of the first outer wall S1, and a fourth outer wall S4 having a curved shape with a certain curvature and connected to the other end of the second outer wall S2 and the other end of the third outer wall S3.

Figure 4C:
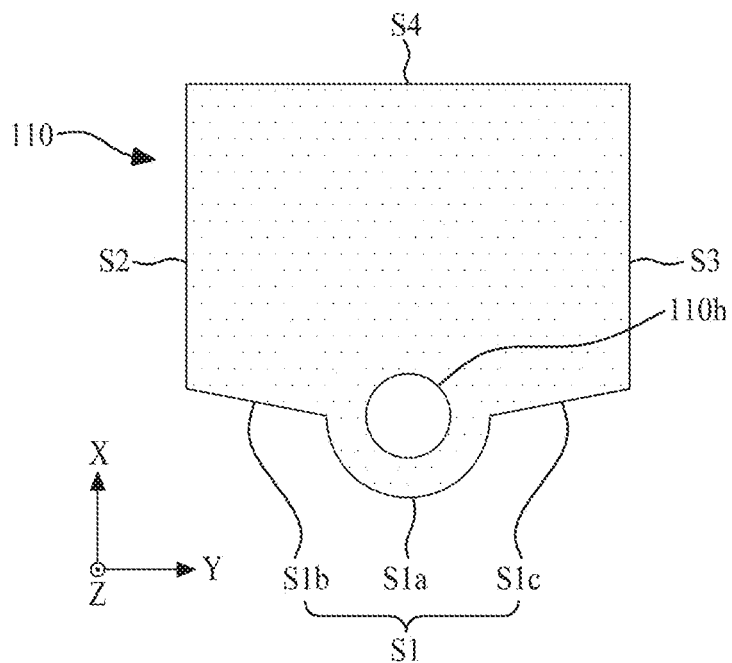

With reference to FIG. 4C, a light guide member 110 according to a third modified embodiment may have a tetragonal shape, including a first hole 110h, where one side S1 includes a curved surface and an inclined surface. For example, the light guide member 110 according to the third modified embodiment may include a first outer wall S1 which includes a curved surface S1a surrounding a lower portion of the first hole 110h and first and second inclined surfaces S1b and S1c inclined from the curved surface S1a, a second outer wall S2 parallel to a first axial direction X and connected to the first inclined surface S1b of the first outer wall S1, a third outer wall S3 parallel to the second outer wall S2 and connected to the second inclined surface S1c of the first outer wall S1, and a fourth outer wall S4 parallel to a second axial direction Y horizontally intersecting the first axial direction X and connected to the other end of the second outer wall S2 and the other end of the third outer wall S3. Here, the first hole 110h may be disposed close to the first outer wall S1 with respect to a lower area of the light guide member 110, e.g., a center between the first and fourth outer walls S1 and S4. A center of the first hole 110h may be disposed under a virtual horizontal line which connects one end of the second outer wall S2 to one end of the third outer wall S3. Also, the curved surface S1a may be provided in a semicircular shape having a concentric shape with the first hole 110h.

Figure 4D:
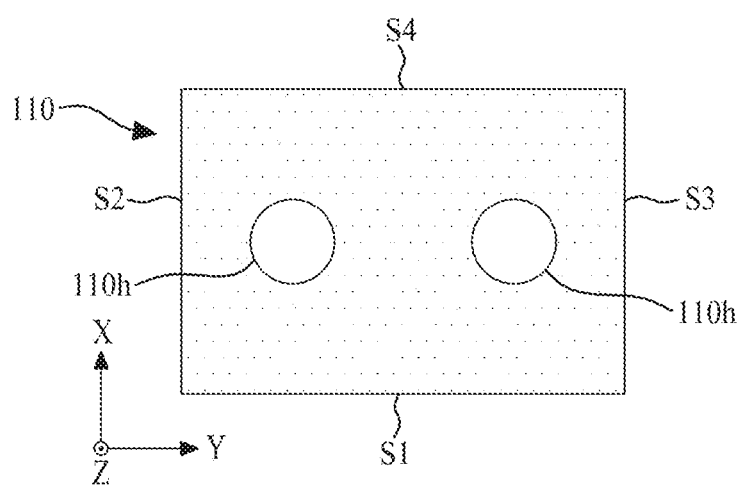

With reference to FIG. 4D, a light guide member 110 according to a fourth modified embodiment may have a rectangular shape including two first holes 110h that are disposed parallel to sides of the rectangular shape. For example, the light guide member 110 according to the fourth modified embodiment may include a first outer wall S1 parallel to a second axial direction Y, a second outer wall S2 parallel to a first axial direction X and connected to one end of the first outer wall S1, a third outer wall S3 parallel to the second outer wall S2 and connected to the other end of the first outer wall S1, and a fourth outer wall S4 connected to the other end of the second outer wall S2 and the other end of the third outer wall S3.

Figure 4E:
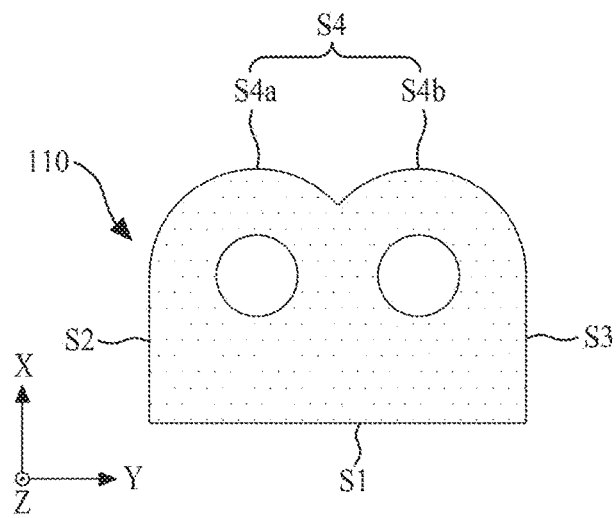

With reference to FIG. 4E, a light guide member 110 according to a fifth modified embodiment may have a tetragonal shape, including two first holes 110h disposed parallel to the Y-axis, where one side S4 includes first and second curved surfaces S4a and S4b. For example, the light guide member 110 according to the fifth modified embodiment may include a first outer wall S1 parallel to a second axial direction Y, a second outer wall S2 parallel to a first axial direction X and connected to one end of the first outer wall S1, a third outer wall S3 parallel to the second outer wall S2 and connected to the other end of the first outer wall S1, and a fourth outer wall S4 including first and second curved surfaces S4a and S4b that are parallel to surround an upper portion of each of the two first holes 110h and connected to the other end of the second outer wall S2 and the other end of the third outer wall S3. Here, the two first holes 110h may be parallel to each other and may be disposed close to the first outer wall S1 with respect to an upper area of the light guide member 110, e.g., a center between the first and fourth outer walls S1 and S4. Also, each of the first and second curved surfaces S4a and S4b may be provided in a semicircular shape having a concentric shape with the two first holes 110h.

Figure 4F:
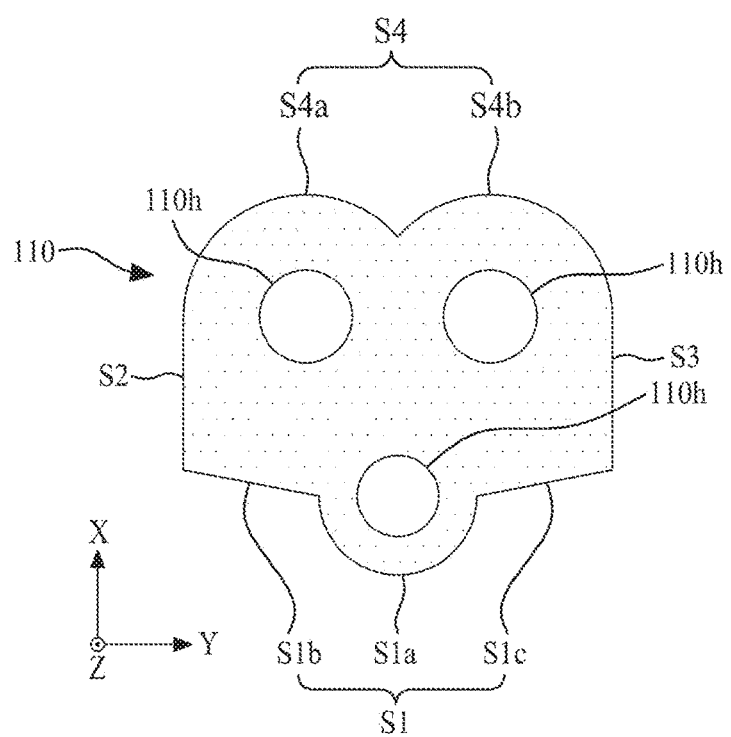

With reference to to FIG. 4F, a light guide member 110 according to a sixth modified embodiment may have a tetragonal shape, including one lower first hole 110h and two upper first holes 110h, where one side S1 includes a lower curved surface S1a and an inclined surface and the other side S4 includes first and second curved surfaces S4a and S4b. The light guide member 110 may be configured by a combination of the light guide member according to the third modified embodiment and the light guide member according to the fifth modified embodiment. For example, the light guide member 110 according to the sixth modified embodiment may include a first outer wall S1 having a lower curved surface S1a surrounding the one lower first hole 110h, and first and second inclined surfaces S1b and S1c inclined from the lower curved surface S1a, a second outer wall S2 parallel to a first axial direction X and connected to the first inclined surface S1a of the first outer wall S1, a third outer wall S3 parallel to the second outer wall S2 and connected to the second inclined surface S1*b* of the first outer wall S1, and a fourth outer wall S4 including first and second upper curved surfaces S4*a* and S4*b* that are parallel to surround an upper portion of each of the two upper first holes 110*h* and are connected to the other end of the second outer wall S2 and the other end of the third outer wall S3.

As a result, the light guide member 110 according to the embodiments of the present invention may include at least one outer wall having various shapes which includes a curved surface and an inclined surface. Thus, the backlight unit may be applied to various fields.

Figure 5:
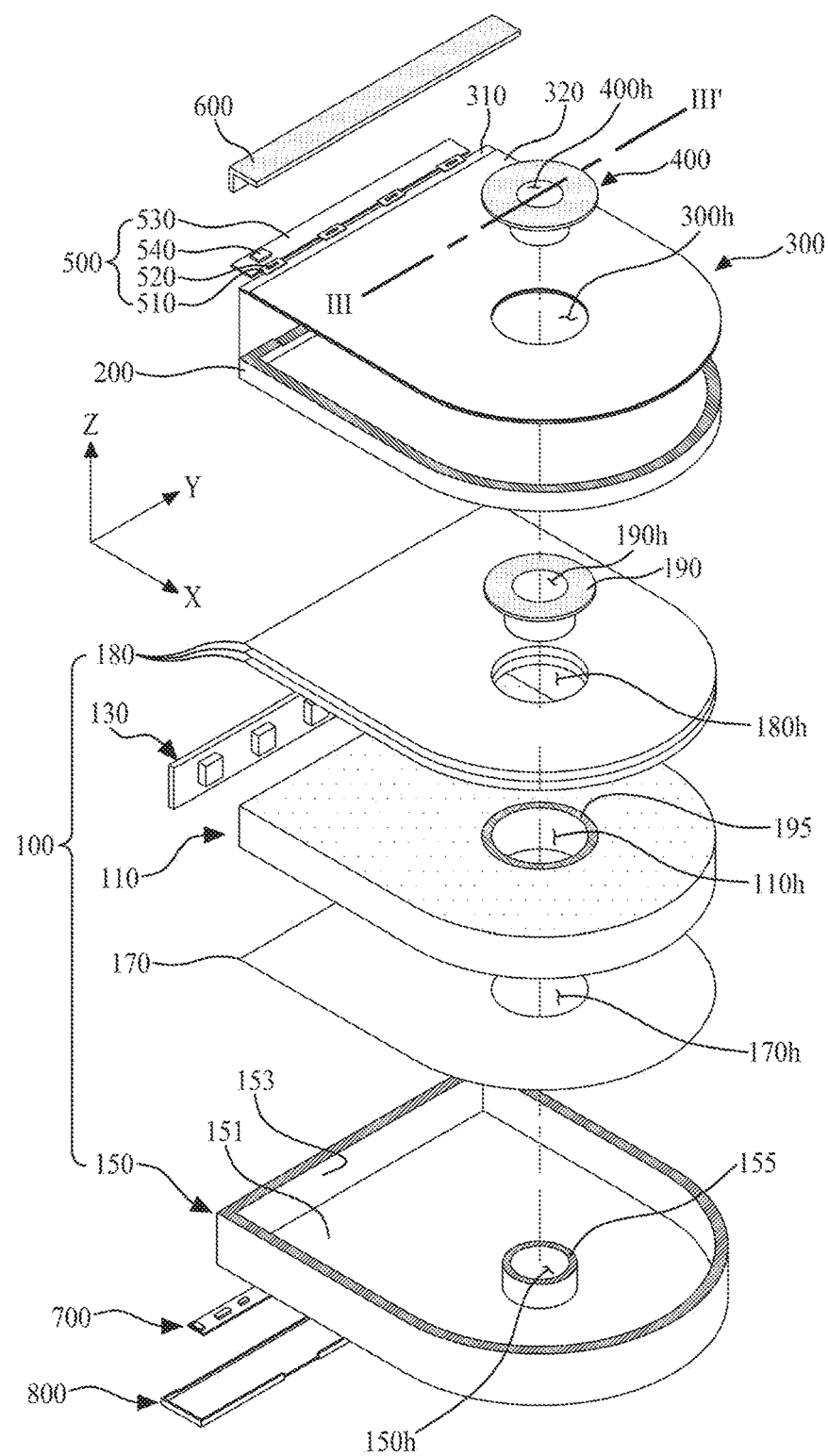
FIG. 5 is an exploded perspective view for describing an LCD device according to an example embodiment of the present invention.
Figure 6:
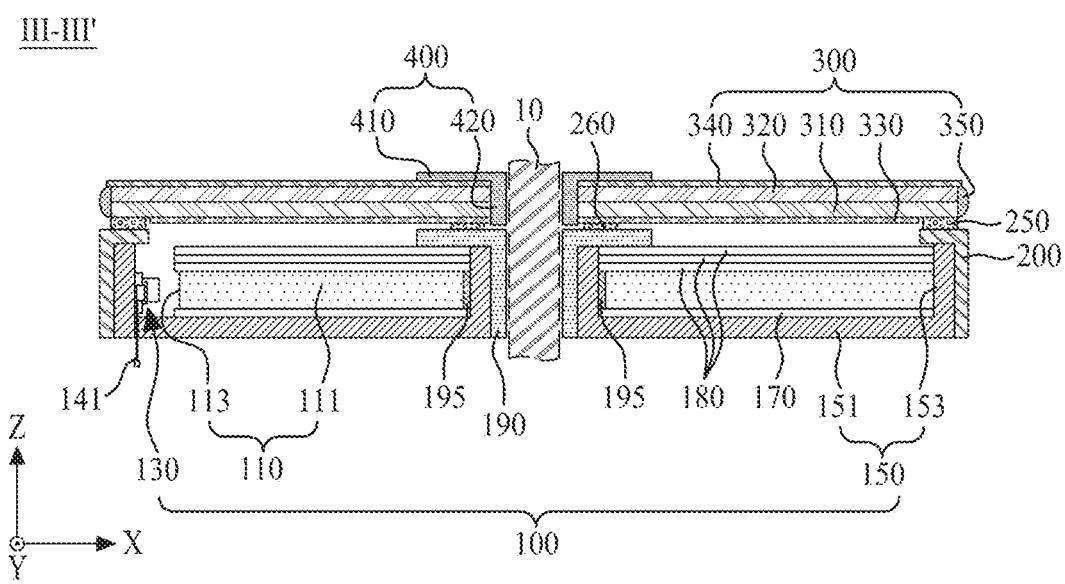
FIG. 6 is a cross-sectional view taken along line of FIG. 5.

FIG. 5 is an exploded perspective view for describing an LCD device according to an example embodiment of the present invention. FIG. 6 is a cross-sectional view taken along line III-III' of FIG. 5.

As shown in FIGS. 5 and 6, the LCD device may include a backlight unit 100, a guide frame 200, a liquid crystal display panel 300, and a panel hole cover 400. Also, the LCD device may further include a panel driving circuit unit 500, a front cover 600, a light source driver 700, and a cover shield 800.

The backlight unit 100 may include a light guide member 110, a light source module 130, a housing member 150, a reflective sheet 170, an optical sheet part 180, and a hole cap 190. That is, the backlight unit 100 may include similar elements as those of the backlight unit according to the example embodiments of FIGS. 1 to 4F, and thus, detailed descriptions of the same elements are not repeated.

The guide frame 200 may have a tetragonal frame shape and may be supported by the housing member 150 of the backlight unit 100 to support the liquid crystal display panel 300. In this case, the guide frame 200 may be supported by the side wall 153 of the housing member 150 and may surround the side wall 153 of the housing member 150. The guide frame 200 may include a Γ-shaped (bent shaped) cross-sectional surface and may have the same shape as that of the housing member 150 to surround the side wall 153 of the housing member 150.

The liquid crystal display panel 300 may display an image using light irradiated from the backlight unit 100. The liquid crystal display panel 300 may include a lower substrate 310, an upper substrate 320, a lower polarization member 330, an upper polarization member 340, and a fourth hole 300*h*. The lower substrate 310 and the upper substrate 320 may be face-bonded to each other with a liquid crystal layer (not shown) therebetween.

The lower substrate 310 may be a thin film transistor (TFT) array substrate and may include a pixel array including a plurality of pixels (not shown) respectively provided in a plurality of pixels areas defined by intersections of a plurality of gate lines (not shown) and a plurality of data lines (not shown). Each of the plurality of pixels may include a TFT (not shown) connected to a gate line and a data line, a pixel electrode connected to the TFT, and a common electrode adjacent to the pixel electrode and to be supplied with a common voltage.

A pad part connected to a plurality of signal lines may be provided in one edge of the lower substrate 310 and may be connected to the panel driving circuit unit 500. Also, a gate driving circuit (not shown) for supplying a gate signal (or a scan signal) to the plurality of gate lines may be provided in a non-display area parallel to the first axial direction X of the lower substrate 310. The gate driving circuit may be manufactured simultaneously in a process of manufacturing the TFT of each pixel and may be connected to the plurality of gate lines.

The upper substrate 320 may include a pixel defining pattern that defines an opening area overlapping each of the plurality of pixels areas provided on the lower substrate 310, and a color filter provided in the opening area. The upper substrate 320 may be face-bonded to the lower substrate 310 by a sealant with the liquid crystal layer therebetween.

The liquid crystal layer may be disposed between the lower substrate 310 and the upper substrate 320 and may include liquid crystal having liquid crystal molecules of which an alignment direction is changed according to an electric field generated by a data voltage applied to the pixel electrode and the common voltage applied to the common electrode in each pixel. The lower polarization member 330 may be adhered to a bottom of the lower substrate 310 and may polarize light incident from the backlight unit 100 to a first polarization axis, thereby irradiating polarized light onto the lower substrate 310.

The upper polarization member 340 may be adhered to a top of the upper substrate 320 and may output light to the outside from the upper substrate 320. The upper polarization member 340 according to an embodiment may include a polarization film which is adhered to the top of the upper substrate 320 and polarizes color light to be output to the outside through the upper substrate 320, to a second polarization axis different from the first polarization axis.

The fourth hole 300*h* may be provided to vertically passing through the liquid crystal display panel 300 along the vertical axial direction Z and communicate with the first hole 100*h* provided in the light guide member 110 of the backlight unit 100. The lower substrate 310 and the upper substrate 320, which are adjacent to each other, may be bonded to each other near the fourth hole 300*h* by an internal sealant. Thus, the liquid crystal layer disposed between the lower substrate 310 and the upper substrate 320 may be sealed by the internal sealant and is not leaked by the fourth hole 300*h*. Here, because the fourth hole 300*h* is provided in the liquid crystal display panel 300, a gate line and a data line which are disconnected from each other by the fourth hole 300*h* may be connected to each other through a separate gate detour line (not shown) and data detour line (not shown) provided in an internal non-display area of the lower substrate 310 surrounding the fourth hole 300*h*.

The liquid crystal display panel 300 may drive the liquid crystal layer according to the electric field of each pixel which is generated by the data voltage and the common voltage applied to each pixel, thereby displaying a color image according to light passing through the liquid crystal layer.

In addition, the liquid crystal display panel 300 may further include a side sealing member 350. The side sealing member 350 may be provided to cover three side surfaces of the liquid crystal display panel 300 except one edge of the liquid crystal display panel 300. For example, the side sealing member 350 may directly cover the three side surfaces of the liquid crystal display panel 300 connected to a left upper corner, an upper surface, a right upper corner, and a right surface except a lower surface of the liquid crystal display panel 300 where the pad part is provided, with respect to a display surface of the liquid crystal display panel 300 which stands vertically. The side sealing member 350 protects the three side surfaces of the liquid crystal display panel 300, which are exposed to outside the liquid crystal display device without being covered by a mechanism, such as the guide frame 200 and/or the like, from an external impact and prevents the side light leakage of the liquid crystal display panel 300.

The side sealing member 350 may be formed of a silicon-based or ultraviolet (UV) curing-based sealant (or resin), but considering a process tack time, the side sealing member 350 may be formed of the UV curing-based sealant. Also, the side sealing member 350 may have a color (for example, blue, red, bluish green, or black), but is not limited thereto. The side sealing member 350 may be formed of a colored resin or a light blocking resin to prevent side light leakage.

A top of the side sealing member 350 may be covered by the upper polarization member 340. To this end, three side surfaces of the upper polarization member 340 may include an extension part extending to cover the top of the side sealing member 350 and adhered to the top of the side sealing member 350. Therefore, a junction surface between the side sealing member 350 and the liquid crystal display panel 300 may be covered by the extension part of the upper polarization member 340 and, thus, may not be exposed to a front surface of the liquid crystal display device.

The liquid crystal display panel 300 may have a shape which is the same as that of the backlight unit 100 (e.g., the light guide member 110), and may be coupled to the guide frame 200 by a panel coupling member 250. That is, a bottom of the panel coupling ember 250 may be physically coupled to the guide frame 200, and a top of the panel coupling member 250 may be physically coupled to the liquid crystal display panel 300, e.g., a rear edge of the lower substrate 310. The panel coupling member 250 may attach the liquid crystal display panel 300 to the guide frame 200, thereby preventing the liquid crystal display panel 300 from being separated from the guide frame 200 and dropped. The panel coupling member 250 may be a double-sided tape, a thermocurable adhesive, a photocurable adhesive, a foam tape, or the like, and particularly, may be a double-sided tape or a foam tape which has an elastic force for absorbing an impact. Additionally, a hollow portion buffers pressure applied to the liquid crystal display panel 300 and prevents the panel coupling member 250 from being partially detached from the liquid crystal display panel 300 when the liquid crystal display panel 300 moves.

In addition, a pad member 260 may be disposed between the hole cap 190 of the backlight unit 100 and a bottom near the fourth hole 300h provided in the liquid crystal display panel 300. The pad member 260 may be formed of a foam tape or a foam pad having a circular band shape. The pad member 260 may be disposed on a top of the hole cap 190 to support the liquid crystal display panel 300 adjacent to the fourth hole 300h.

The panel hole cover 400 may cover a portion near of the fourth hole 300h provided in the liquid crystal display panel 300. The panel hole cover 400 according to an embodiment may include a front cover part 410, a hole insertion part 420, and a fifth hole 400h.

The front cover part 410 may cover a portion near the fourth hole 300h provided in the liquid crystal display panel 300. The front cover part 410 may be adhered to the upper polarization member 340 to cover the portion near the fourth hole 300h by using an adhesive member (not shown), such as a double-sided tape or the like. The front cover part 410 according to an embodiment may have a circular band shape.

The hole insertion part 420 may be inserted into the fourth hole 300h provided in the liquid crystal display panel 300 and may protrude from a center of the front cover part 410 to inside the fourth hole 300h. The hole insertion part 420 may be omitted. The fifth hole 400h may be provided to vertically pass through the hole insertion part 420 and the front cover part 410 the liquid crystal display panel 300 along the vertical axial direction Z and communicate with the first hole 100h provided in the light guide member 110 of the backlight unit 100. The auxiliary mechanism 10, which vertically passes through a plurality of holes 150h, 170h, 180h, and 190h in addition to the first hole 100h provided in the backlight unit 100, may be inserted into and disposed in the fourth and fifth holes 300h and 400h.

The panel driving circuit unit 500 may be connected to the pad part provided on the lower substrate 310 to drive the pixels of the liquid crystal display panel 300, thereby displaying a color image on the liquid crystal display panel 300. Also, the panel driving circuit unit 500 may generate a backlight dimming signal for controlling luminance in each area of the light guide member 110, and may supply the backlight dimming signal to the light source driver 700.

The panel driving circuit unit 500 may include a plurality of flexible circuit films 510 connected to the pad part of the liquid crystal display panel 300, a data driving integrated circuit (IC) 520 mounted on each of the plurality of flexible circuit films 510, a printed circuit board (PCB) 530 coupled to each of the plurality of flexible circuit films 510, and a timing controller 540 mounted on the PCB 530.

The plurality of flexible circuit films 510 may be attached between the pad part of the lower substrate 310 and the PCB 530 by a film attach process, and may each be a tape carrier package, a chip-on film (COF, chip-on flexible board), or the like. The plurality of flexible circuit films 510 may be bent along a lower surface of the liquid crystal display panel 300 and may be disposed on a rear surface of the housing member 150.

The data driving IC 520 may be mounted on each of the flexible circuit films 510 and may be connected to the pad part through each of the flexible circuit films 510. The data driving IC 520 may receive pixel-based data and a data control signal supplied from the timing controller 540, convert the pixel-based data into an analog data signal according to the data control signal, and supply the analog data signal to a corresponding data line through the pad part.

The PCB 530 may be connected to the plurality of flexible circuit films 510. The PCB 530 may supply signals, which are necessary for displaying an image on each pixel of the liquid crystal display panel 300, to the data driving IC 520 and a gate driving circuit. To this end, various signal lines, various power circuits (not shown), and a memory device (not shown) may be mounted on the PCB 530.

The timing controller 540 may be mounted on the PCB 530. In response to a timing synchronization signal supplied from an external driving system (not shown), the timing controller 540 may align digital video data input from the external driving system according to a pixel arrangement structure of the liquid crystal display panel 300 to generate pixel-based data and may supply the generated pixel-based data to the data driving IC 520. Also, the timing controller 540 may generate the data control signal and the gate control signal, based on the timing synchronization signal and may control a driving timing of each of the data driving IC 520 and the gate driving circuit.

Moreover, the timing controller 540 may control the backlight unit 100 through edge type local dimming technology to individually control luminance in each area of the liquid crystal display panel 300. That is, the timing controller 540 may divide the liquid crystal display panel 300 into a plurality of areas, analyze the digital video data in units of one frame to generate an area-based backlight dimming signal, and supply the area-based backlight dimming signal to the light source driver 700.

The front cover 600 may be coupled to one side of the guide frame 200 to cover one edge of the liquid crystal display panel 300. The front cover 600 may cover the one edge of the liquid crystal display panel 300 to cover the pad part of the lower substrate 310 and the panel driving circuit unit 500 connected to the pad part.

The light source driver 700 may be connected to the LED connector 135 of the light source module 130 through the backlight power cable, thereby emitting light from the plurality of LEDs 133. At this time, the light source driver 700 may allow at least one of the LEDs 133 to emit light in response to the backlight dimming signal supplied from the timing controller 540, thereby controlling luminance in each area of the light guide member 110. The cover shield 800 may be coupled to the rear surface of the housing member 150 to cover the light source driver 700 and the PCB 530 disposed on the rear surface of the housing member 150.

In the LCD device, the reflective member 195 may be disposed in the first hole 110h which is provided to vertically pass through one area of the light guide member 110. Thus, luminance around the first hole 110h and whole luminance of the liquid crystal display panel 300 are uniform.

Figure 7:
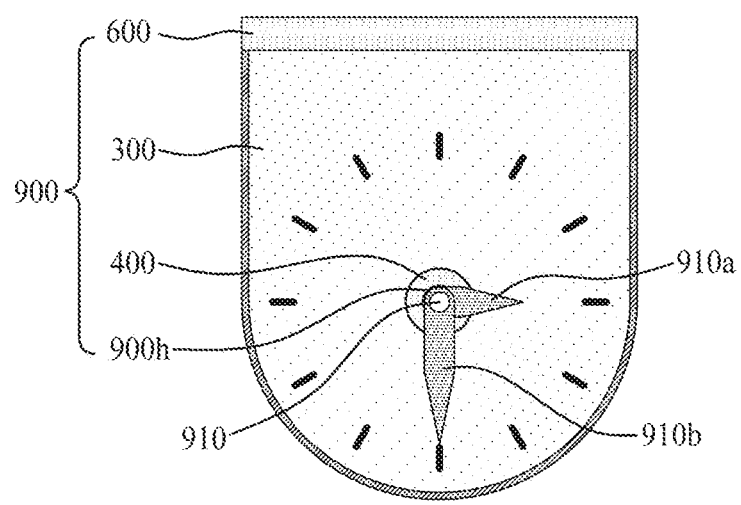
FIG. 7 is a diagram for describing an electronic device according to a first example embodiment of the present invention.

FIG. 7 is a diagram for describing an electronic device according to a first example embodiment of the present invention. With reference to FIG. 7, the electronic device may include an LCD device 900, a rotational shaft module 910, an hour hand 910a, and a minute hand 910b.

The LCD device 900 may include a vertical through hole 900h and may include similar elements as those of the LCD device illustrated in FIG. 5, and thus, repetitive descriptions on the elements are not repeated. However, the vertical through hole 900h may be a generic name for the holes 110h, 150h, 170h, 180h, 190h, 300h, and 400h, which are provided in the LCD device 900 to communicate with each other as illustrated in FIG. 5.

The rotational shaft module 910 may be inserted into and disposed in the vertical through hole 900h of the LCD device 900 and may be rotated by a rotary module (not shown). The rotational shaft module 910 may include a first rotational shaft, which rotates once in units of twelve hours, and a second rotational shaft, which rotates once in units of one hour.

The hour hand 910a may be connected to the first rotational shaft of the rotational shaft module 910 to rotate once in units of twelve hours. The minute hand 910b may be connected to the second rotational shaft of the rotational shaft module 910 to rotate once in units of one hour.

The electronic device according to the first example embodiment of the present invention may display a time based on the hour hand 910a and the minute hand 910b according to a physical rotation of the rotational shaft module 910 disposed in the vertical through hole 900h of the LCD device 900, and may display various information or images in addition to a time through a liquid crystal display panel 300 of the LCD device 900.

Figure 8:
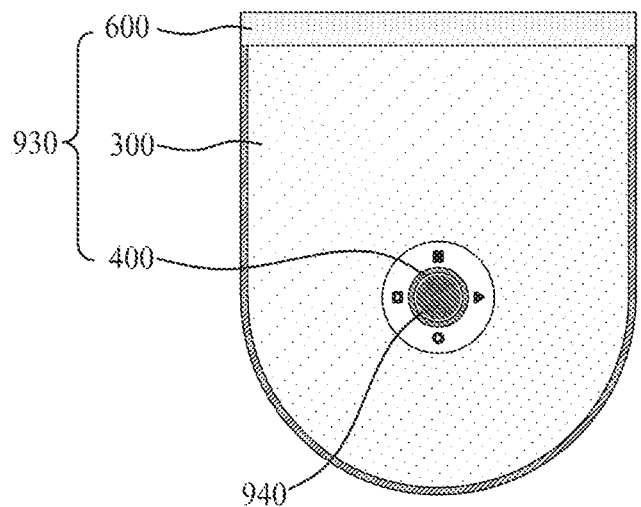
FIG. 8 is a diagram for describing an electronic device according to a second example embodiment of the present invention.

FIG. 8 is a diagram for describing an electronic device according to a second example embodiment of the present invention and is a diagram illustrating a vehicle manipulation panel to which the LCD device according to an embodiment of the present invention is applied. With reference to FIG. 8, the electronic device may include an LCD device 930 and a jog shuttle 940.

The LCD device 930 may include a vertical through hole (not shown) and may include similar elements as those of the LCD device illustrated in FIG. 5, and thus, repetitive descriptions on the elements are not repeated. However, the vertical through hole may be a generic name for the holes 110h, 150h, 170h, 180h, 190h, 300h, and 400h, which are provided in the LCD device 930 to communicate with each other as illustrated in FIG. 5. The jog shuttle 940 may include a rotational shaft which is inserted into and disposed in the vertical through hole of the LCD device 930 and may rotate according to manual manipulation by a user.

The electronic device according to the second example embodiment of the present invention may receive user input information corresponding to a physical rotation angle of the jog shuttle 940 disposed in the vertical through hole of the LCD device 930 and may display various information or images on a liquid crystal display panel 300 of the LCD device 930, thereby increasing convenience of users.

Figure 9:
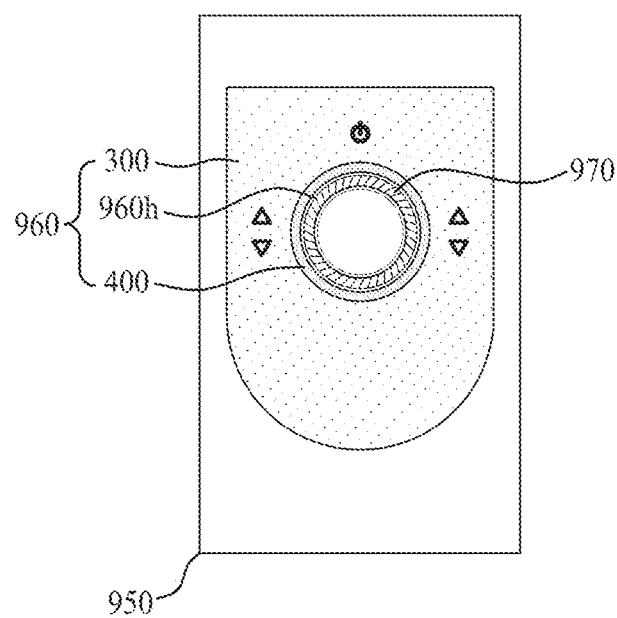
FIG. 9 is a diagram for describing an electronic device according to a third example embodiment of the present invention.

FIG. 9 is a diagram for describing an electronic device according to a third example embodiment of the present invention and is a diagram illustrating a blast apparatus to which the LCD device according to an example embodiment of the present invention is applied. Here, the blast apparatus may be an air conditioner, a heating apparatus, an air-conditioning and heating apparatus, or the like. With reference FIG. 9, the electronic device may include a body 950, an LCD device 960, and a fan module 970.

The body 950 may have a stand type and may accommodate the fan module 970. The LCD device 960 may include a vertical through hole 960h and may include the similar elements as those of the LCD device illustrated in FIG. 5. Thus, repetitive descriptions on the elements are not repeated. However, the vertical through hole 960h may be a generic name for the holes 110h, 150h, 170h, 180h, 190h, 300h, and 400h, which are provided in the LCD device 960 to communicate with each other as illustrated in FIG. 5. The LCD device 960 may be installed on a front surface of the body 950 so that the vertical through hole 960h and a display area of a liquid crystal display panel 300 are exposed to a position at which a user is located.

The fan module 970 may be installed in the body 950 to overlap the vertical through hole 960h of the LCD device 960 or to be inserted into the vertical through hole 960h. The fan module 970 according to an embodiment may include a rotational shaft, which rotates according to a rotation of a rotary motor, and a blast fan installed on the rotational shaft. The fan module 970 may send air to the front of the body 950 through the vertical through hole 960h of the LCD device 960 according to a rotation of the blast fan performed by a rotation of the rotary motor of the fan module 970.

The electronic device according to the third example embodiment of the present invention may display various information or images on the liquid crystal display panel 300 of the LCD device 960 while sending air through a physical rotation of the fan module 970 disposed in the vertical through hole 960h of the LCD device 960.

In the electronic device according to the present example embodiment, an auxiliary mechanism may be installed in a vertical through hole of an LCD device, thereby realizing various designs of a vehicle mechanism or a home mechanism in which a physical mechanism and the LCD device are merged with each other.

As described above, according to the embodiments of the present invention, because the reflective member is disposed on the inner wall of the light guide member provided based on the hole, light is not lost in an area where the hole is provided. Accordingly, light efficiency is enhanced, and light leakage does not occur in the area where the hole is provided.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
 a light guide member including a light receiving edge provided on an outer wall, and a first hole that is spaced apart from the light receiving edge and is a through hole;
 a light source configured to provide light to the light receiving edge; and
 a reflective member on an entire inner wall of the first hole of the light guide member.

2. The backlight unit of claim 1, wherein the reflective member includes a specular reflection film.

3. The backlight unit of claim 2, wherein the specular reflection film has a stacked structure in which a plurality of layers including a metal layer are stacked or a stacked structure in which a plurality of layers including a material layer having a refractive index anisotropic characteristic are stacked.

4. The backlight unit of claim 1, wherein the reflective member includes a scattering film.

5. The backlight unit of claim 4, wherein the scattering film has an upper film including an inorganic particle, a lower film including an inorganic particle, a plurality of beads provided between the upper film and the lower film, and an air pocket between the plurality of beads.

6. The backlight unit of claim 1, further comprising a housing member including a second hole communicating with the first hole of the light guide member and accommodating the light guide member.

7. The backlight unit of claim 1, wherein the light guide member includes a plurality of outer walls, at least one of the plurality of outer walls having at least one of a curved surface and an inclined surface.

8. A liquid crystal display (LCD) device, comprising:
 a backlight unit including:
  a light guide member having a light receiving edge provided on an outer wall, and a first hole that is spaced apart from the light receiving edge and is a through hole,
  a light source configured to provide light to the light receiving edge, and
  a reflective member on an entire inner wall of the first hole of the light guide member; and
 a liquid crystal display panel including a second hole communicating with the first hole of the light guide member.

9. The LCD of claim 8, wherein the reflective member includes a specular reflection film.

10. The LCD of claim 9, wherein the specular reflection film has a stacked structure in which a plurality of layers including a metal layer are stacked or a stacked structure in which a plurality of layers including a material layer having a refractive index anisotropic characteristic are stacked.

11. The LCD of claim 8, wherein the reflective member includes a scattering film.

12. The LCD of claim 11, wherein the scattering film has an upper film including an inorganic particle, a lower film including an inorganic particle, a plurality of beads provided between the upper film and the lower film, and an air pocket between the plurality of beads.

13. The LCD of claim 8, further comprising a housing member including a third hole communicating with the first hole of the light guide member and accommodating the light guide member.

14. The LCD of claim 8, wherein the light guide member includes a plurality of outer walls, at least one of the plurality of outer walls having at least one of a curved surface and an inclined surface.

15. An electronic device, comprising:
 a backlight unit including:
  a light guide member having a light receiving edge provided on an outer wall, and a first hole that is spaced apart from the light receiving edge and is a through hole,
  a light source configured to provide light to the light receiving edge, and
  a reflective member on an entire inner wall of the hole of the light guide member;
 a liquid crystal display panel including a second hole communicating with the first hole of the light guide member; and
 an auxiliary mechanism in the first hole of the light guide member.

16. The electronic device of claim 15, wherein the reflective member includes a specular reflection film.

17. The electronic device of claim 16, wherein the specular reflection film has a stacked structure in which a plurality of layers including a metal layer are stacked or a stacked structure in which a plurality of layers including a material layer having a refractive index anisotropic characteristic are stacked.

18. The electronic device of claim 15, wherein the reflective member includes a scattering film.

19. The electronic device of claim 18, wherein the scattering film has an upper film including an inorganic particle, a lower film including an inorganic particle, a plurality of beads provided between the upper film and the lower film, and an air pocket between the plurality of beads.

20. The electronic device of claim 15, further comprising a housing member including a hole communicating with the hole of the light guide member and accommodating the light guide member.

21. The electronic device of claim 15, wherein the light guide member includes a plurality of outer walls, at least one of the plurality of outer walls having at least one of a curved surface and an inclined surface.

22. The electronic device of claim 15, wherein the auxiliary mechanism includes one of a rotational shaft of a jog shuttle, a rotational shaft of a clock hand, a rotational shaft of a blast apparatus, and a rotational shaft of an instrument panel for vehicles.

* * * * *